Oct. 16, 1951     P. H. TAYLOR     2,571,308
PARALLELING LENS SYSTEM
Filed July 3, 1950
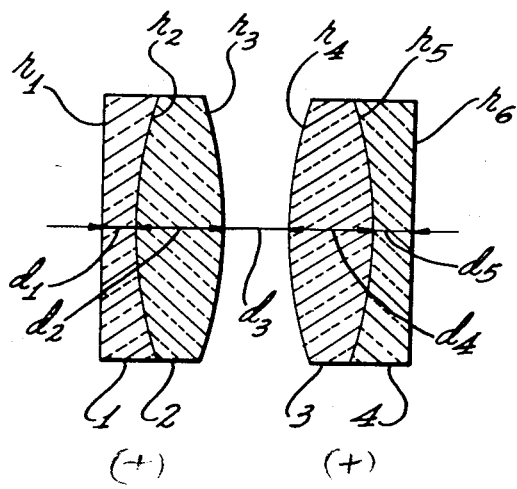
INVENTOR:
PHILIP H. TAYLOR
BY Herbert E. Metcalf
HIS PATENT ATTORNEY Patented Oct. 16, 1951

2,571,308

UNITED STATES PATENT OFFICE 2,571,308

PARALLELING LENS SYSTEM

Philip H. Taylor, Los Angeles, Calif., assignor to Northrop Aircraft, Inc., Hawthorne, Calif., a corporation of California Application July 3, 1950, Serial No. 171,790

1 Claim. (Cl. 88—57)

This invention relates to a double-doublet paralleling lens system.

An object of the invention is to provide a lens system in which the largest possible field is obtained, for a given focal length, when the lens is used either as a paralleling device or as an eyepiece. However, the increased aperture is always obtained, in any specified lens form, at the expense of less "eye relief" which, for photo-electric image response applications, means decreased distance from the last optical surface to the photocell.

Thus, with eye-relief as the main limiting factor governing the achievement of any maximum size field, the following advantages and characteristics of the lens system of the present invention are here presented, these features in turn being additional objects of the invention.

1. The lens have a high degree of axial correction.
2. All curved surfaces have the same radius; hence, only one manufacturing tool is needed, leading to the least expensive four-element lens possible.
3. Unlike the Huygenian or Ramsden systems, the air space is uncritical, which makes for ease of mounting in manufacture.
4. A large eye-relief; the smallness of this in the two types mentioned under item 3 above makes them nearly useless as paralleling lenses.
5. The thicknesses of all elements are not critical. For the best performance, the tolerances should be ±.01, however, ±.016 is good enough for most purposes.
6. The sphericity of surfaces and centering need only be fair.

Briefly, the present invention involves a paralleling lens or eyepiece having two spaced identical doublet components, each consisting of a negative plano-concave lens and an equi-convex positive lens cemented together. The doublets are assembled with their convex surfaces facing to form a lens system where the front and back surfaces are flat planes, and all curved surfaces have the same radius.

The figure in the drawing shows diagrammatically the outline of the axial cross section of a lens system constructed in accordance with the present invention.

Referring to the drawing, the lens system comprises four lenses in the form of two spaced doublets each consisting of a diverging and a collective lens. A negative plano-concave front lens 1 is cemented to a positive equi-convex lens 2 along a surface having a radius $r_2$. A third lens 3 is identical to the positive lens 2 and is cemented along a surface having a radius $r_5$ to the final lens 4 which is identical to the front lens 1. Thus, the two doublets are identical and are arranged with their convex surfaces $r_3$ and $r_4$ facing each other.

Front and rear surfaces having infinite radii $r_1$ and $r_6$, i. e., are flat.

Construction data for a preferred example of a paralleling lens or eyepiece in accordance with the present invention, and the associated aberrations for a pupil diameter of 0.123 in the system, follows (all dimensions in inches):

| Prescription | Glass | $N_D$ | $V$ |
|---|---|---|---|
| $r_1 =$ is ∞ (flat) | | | |
| $d_1 = .091 \pm .010$ | DF-3 | $1.6210 \pm .0015$ | $36.2 \pm .3$ |
| $r_2 = .868 \pm .005$ | | | |
| $d_2 = .296 \pm .010$ | BSC-2 | $1.5170 \pm .0010$ | $64.5 \pm .4$ |
| $r_3 = .868 \pm .005$ | | | |
| $d_3 = .009 \pm .002$ | | | |
| $r_4 = .868 \pm .005$ | | | |
| $d_4 = .296 \pm .010$ | BSC-2 | $1.5170 \pm .0010$ | $64.5 \pm .4$ |
| $r_5 = .868 \pm .005$ | | | |
| $d_5 = .091 \pm .010$ | DF-3 | $1.6210 \pm .0015$ | $36.2 \pm .3$ |
| $r_6 =$ is ∞ (flat) | | | |

The symbol $d$ represents axial distances from front to rear in accordance with the symbol subscripts, all distances being lens thicknesses except $d_3$ which is the axial spacing of the doublets.

*Optical constants*

$f'$: 1.000
$l'$: .7496
Principal points to flat surface .2504
Eye relief:
    (a) For $f'_0$ 2.1649, is 1.1948
    (b) For $f'_0$ 8.6228, is .8038
Unit magnification: object and image 1.7496 from flat surfaces
OD of lens: .8475 $\begin{smallmatrix}+.000\\-.002\end{smallmatrix}$
Clear aperture: .7475
Thickness: .7822 (flat to flat)

Where
$r$ is the radius length for an element surface;
$d$ is the axial thickness of an element;
$N_F$ is the index of refraction for the F line of hydrogen (4861 Å);
$N_D$ is the index of refraction for the D line of sodium (5893 Å);
$N_C$ is the index of refraction for the C line of hydrogen (6563 Å);
$V = \dfrac{N_D - 1}{N_F - N_C}$
DF-3 is a dense flint glass;
BSC-2 is a borosilicate crown glass;
$l'$ is the focal length;
$f'$ is the back focal length; and
$f'_0$ is the focal length of the objective.

The aberrations for a pupil diameter of 0.123 are given below:

*Aberrations (pupil diameter of 0.123)*

LA' = .0025±.023
$l'_y - l'_v$ = .0002±.0058
Per Cent Dist' = −3.7 (pin cushion), $f'_o$ 8.6228
Per Cent Dist' = 3.0 (barrel), $f'_o$ 2.1649
X'$_T$ = −.043 (hollow field)
X'$_T$ tan U'$_M$ = −.003 (good definition) for an apparent field of 33°.
Coma'$_T$ = −.00078
Coma'$_s$ = −.00026±.00018

Where

LA' is the spherical aberration equal to the back focal length of the paraxial ray minus the back focal length of the marginal ray;

$l'_y - l'_v$ is a representation of longitudinal color in which $v$ is "violet light" which is usually taken as F (4861 Å) and $y$ is the "apple green" of 5550 Å, represented by no prominent Fraunhofer line;

Per cent Dist' is the measure of distortion;

X'$_T$ is the distance from a selected focal plane to the focal point of an off axis object in the tangential plane. (A prime always refers to the image space.)

tan U'$_M$ is one-half the $f$ number;

Coma'$_T$ is coma error in the tangential plane; and

Coma'$_s$ is the coma error in the sagittal plane.

The data given above refers to a lens of clear aperture of 0.7475. By only increasing the thicknesses of the two crown elements, a clear aperture of 1.0 is obtained, at the expense of less "eye relief" however.

The new prescription for a clear aperture of 1.0 inch (lens diameter of 1.1), and a few significant aberrations are given below:

| Prescription | Glass |
|---|---|
| $r_1$ = is ∞ (flat) | |
| $d_1$ = .091±.010 | DF-3 |
| $r_2$ = .868±.005 | |
| $d_2$ = .500±.010 | BSC-2 |
| $r_3$ = .868±.005 | |
| $d_3$ = .009±.002 | |
| $r_4$ = .868±.005 | |
| $d_4$ = .500±.010 | BSC-2 |
| $r_5$ = .868±.005 | |
| $d_5$ = .091±.010 | DF-3 |
| $r_6$ = is ∞ (flat) | |
| $f'$ = .9654 | |
| $l'$ = .5880 | |
| LA' = .0018 | |

In both of the above prescribed lenses, it is to be noted that the spacing of the components is not critical, the curves are all identical, and not too steep.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

What is claimed is:

A paralleling lens comprising two spaced identical doublet components, each consisting of a negative plano-concave lens and an equi-convex positive lens cemented together, the said doublets being coaxially assembled with their convex surfaces facing to form a lens system wherein the front and back surfaces are flat, all of the curves of said lens components having the same radius constructed in accordance with the following prescription:

| Prescription | Glass | $N_D$ | V |
|---|---|---|---|
| $r_1$ = is ∞ (flat) | | | |
| $d_1$ = .091±.010 | DF-3 | 1.6210±.0015 | 36.2±.3 |
| $r_2$ = .868±.005 | | | |
| $d_2$ = .296±.010 | BSC-2 | 1.5170±.0010 | 64.5±.4 |
| $r_3$ = .868±.005 | | | |
| $d_3$ = .009±.002 | | | |
| $r_4$ = .868±.005 | | | |
| $d_4$ = .296±.010 | BSC-2 | 1.5170±.0010 | 64.5±.4 |
| $r_5$ = .868±.005 | | | |
| $d_5$ = .091±.010 | DF-3 | 1.6210±.0015 | 36.2±.3 |
| $r_6$ = is ∞ (flat) | | | |

Where
r is the radius length for an element surface;
d is the axial thickness of an element;
$N_F$ is the index of refraction for the F line of hydrogen (4861 Å);
$N_D$ is the index of refraction for the D line of sodium (5893 Å);
$N_C$ is the index of refraction for the C line of hydrogen (6563 Å);
$V = \frac{N_D - 1}{N_F - N_C}$;
DF-3 is a dense flint glass;
BSC-2 is a borosilicate crown glass;
$f'$ is the focal length;
$l'$ is the back focal length;

PHILIP H. TAYLOR.

REFERENCES CITED

The following references are of record in the file of this patent:

UNITED STATES PATENTS

| Number | Name | Date |
|---|---|---|
| 853,812 | Lomb | May 14, 1907 |
| 1,159,233 | Konig | Nov. 2, 1915 |
| 1,464,655 | Jacob | Aug. 14, 1923 |
| 1,479,229 | Erfle | Jan. 1, 1924 |
| 1,553,211 | Barr et al. | Sept. 8, 1925 |
| 2,388,031 | Bennett | Oct. 30, 1945 |
| 2,528,468 | Cojan | Oct. 31, 1950 |

FOREIGN PATENTS

| Number | Country | Date |
|---|---|---|
| 4,366 | Great Britain | of 1905 |
| 126,837 | Great Britain | May 22, 1919 |
| 208,207 | Switzerland | Apr. 1, 1940 |